United States Patent
Kuo

(10) Patent No.: US 6,602,409 B1
(45) Date of Patent: Aug. 5, 2003

(54) APPARATUS FOR SUPPLYING DEOZONIZED OZONE STERILIZED WATER

(76) Inventor: Joseph Kuo, No. 20, Industrial Park 7th Rd., Taichung City (TW)

( * ) Notice: Subject to any disclaimer, the term of this patent is extended or adjusted under 35 U.S.C. 154(b) by 29 days.

(21) Appl. No.: 10/053,689

(22) Filed: Jan. 23, 2002

(51) Int. Cl.[7] .................................................. C02F 1/32
(52) U.S. Cl. .................... 210/192; 210/198.1; 210/205; 210/256; 210/259; 210/260; 422/186.3
(58) Field of Search ............................... 210/192, 198.1, 210/205, 252, 256, 259, 260; 422/186.3

(56) References Cited

U.S. PATENT DOCUMENTS

| | | | |
|---|---|---|---|
| 4,865,749 A | * | 9/1989 | Yoshida |
| 5,427,693 A | * | 6/1995 | Mansgrover et al. |
| 5,711,887 A | * | 1/1998 | Gastman et al. |
| 6,299,761 B1 | * | 10/2001 | Wang |

* cited by examiner

Primary Examiner—Betsey Morrison Hoey
(74) Attorney, Agent, or Firm—Pitney, Hardin, Kipp & Szuch LLP

(57) ABSTRACT

An apparatus for supplying deozonized ozone sterilized water includes a first UV lamp unit received in an ozone-containing gas generating member to irradiate oxygen-containing gas flowing through the gas generating member to produce ozone-containing gas. The ozone-containing gas is entrained in water flowing in a water supplying conduit for sterilizing the water. A cooling system can cool the gas generating member during the UV radiation for maintaining the ozone concentration entrained in the water. The ozone sterilized water in the conduit is deozonized by a second UV lamp unit.

6 Claims, 4 Drawing Sheets

APPARATUS FOR SUPPLYING DEOZONIZED OZONE STERILIZED WATER

BACKGROUND OF THE INVENTION

1. Field of the Invention

This invention relates to an apparatus for supplying water, more particularly to an apparatus for supplying deozonized ozone sterilized water capable of entraining ozone generated by UV radiation treatment in water stream for sterilizing the water, and of deozonizing the ozone treated water.

2. Description of the Related Art

It is known that ozone, which is an extremely strong oxidant and which has a high water solubility, can be entrained in water for killing microorganisms in the water for sterilization, and is available by converting oxygen to ozone by radiation of a UV light. Referring to FIG. 1, a conventional ozone generating device is shown to include an outer housing 1 which has a gas inlet 101 connected to an air pump 3 for supply of air, and a gas outlet 102 disposed downstream of the gas inlet 101. An ultraviolet lamp 2 is received in the housing 1 so as to irradiate the air flowing through the outer housing 1 to produce ozone-containing gas. The gas outlet 102 is disposed to be in fluid communication with a water supplying conduit (not shown) to form a water supplying system for supplying sterilized water.

While the above method can generate ozone from air for sterilizing water, the following drawbacks arise:

1. The heat generated in the outer housing 1 owing to radiation of the UV lamp 2 causes to break down and dissolution of the ozone and a decrease in the concentration of the ozone entrained in the water, thereby resulting in a reduction in the sterilizing effect.

2. The ozone sterilized water requires a settling time of at least 20 minutes to deozonize the water for drinking, thereby resulting in lower efficiency for the water supplying system.

SUMMARY OF THE INVENTION

The object of the present invention is to provide an apparatus for supplying deozonized ozone sterilized water which can overcome the above drawbacks.

According to this invention, the apparatus comprises a water supplying conduit adapted for water stream flow, which includes a water feeding inlet in fluid communication with a water source, an outlet for delivering the deozonized ozone sterilized water and disposed downstream of the water feeding inlet, and an intermediate treatment section disposed upstream of the outlet and downstream of the water feeding inlet. The intermediate treatment section has at least a transmissible portion that is made from an ultraviolet radiation permeable material. An ozone-containing gas generating member includes a feeding end for entry of oxygen-containing gas, a gas removing end disposed downstream of the feeding end, and an ozone-containing gas generating section disposed upstream of the gas removing end and downstream of the feeding end. A first ultraviolet lamp unit is disposed to irradiate the oxygen-containing gas flowing through the ozone-containing gas generating section to produce an ozone-containing gas. A cooling system is disposed to cool the ozone-containing gas generating section when the oxygen-containing gas flowing therein is irradiated by the first ultraviolet lamp unit. A gas introducing valve includes a proximate end in fluid communication with the water supplying conduit at a position which is downstream of the water feeding inlet and upstream of the intermediate treatment section, and a distal end in fluid communication with the gas removing end so as to entrain the ozone-containing gas in the water stream. A second ultraviolet lamp is disposed adjacent to the transmissible portion of the intermediate treatment section to irradiate the intermediate treatment section to break down the ozone entrained in the water stream flowing therethrough, thereby delivering the deozonized sterilized water out of the outlet.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
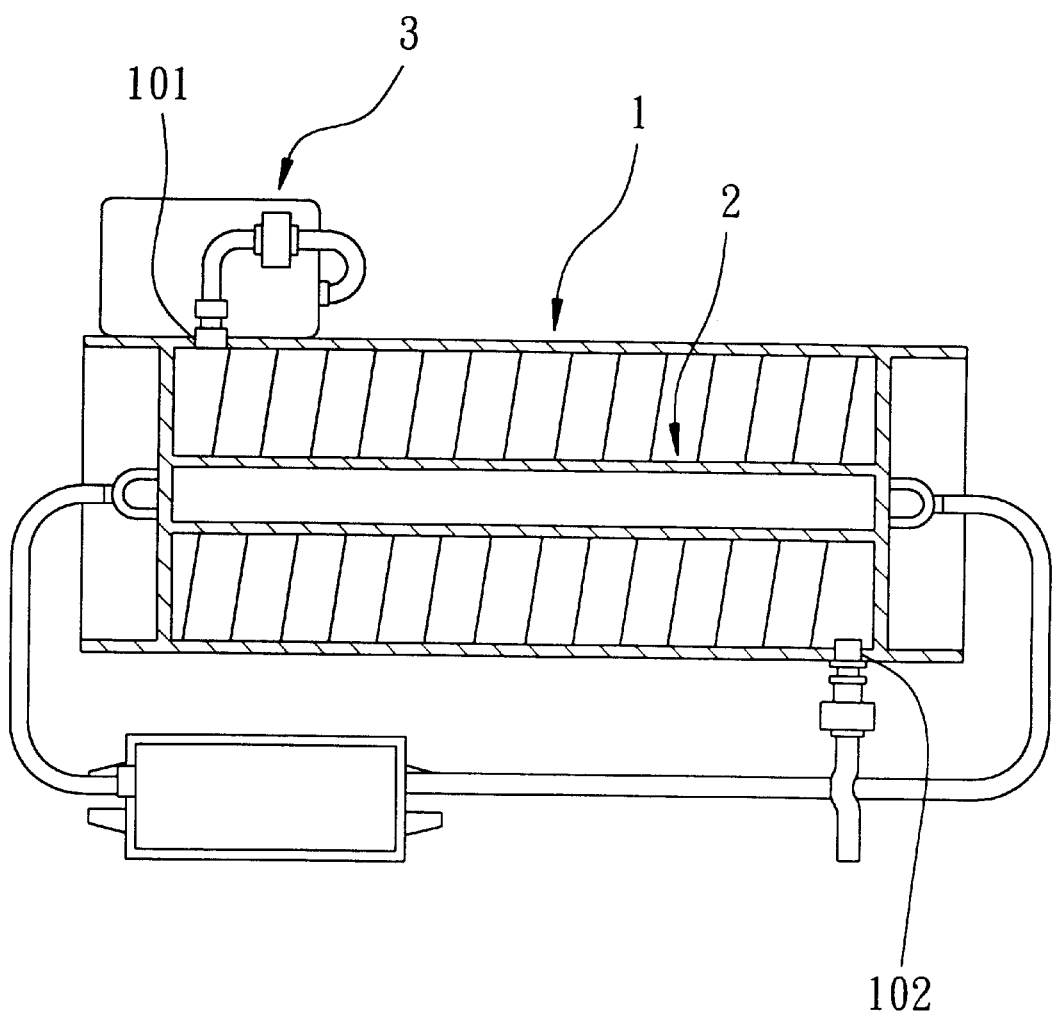
FIG. 1 is a schematic view of a conventional ozone generating sterilized water apparatus.
Figure 2:
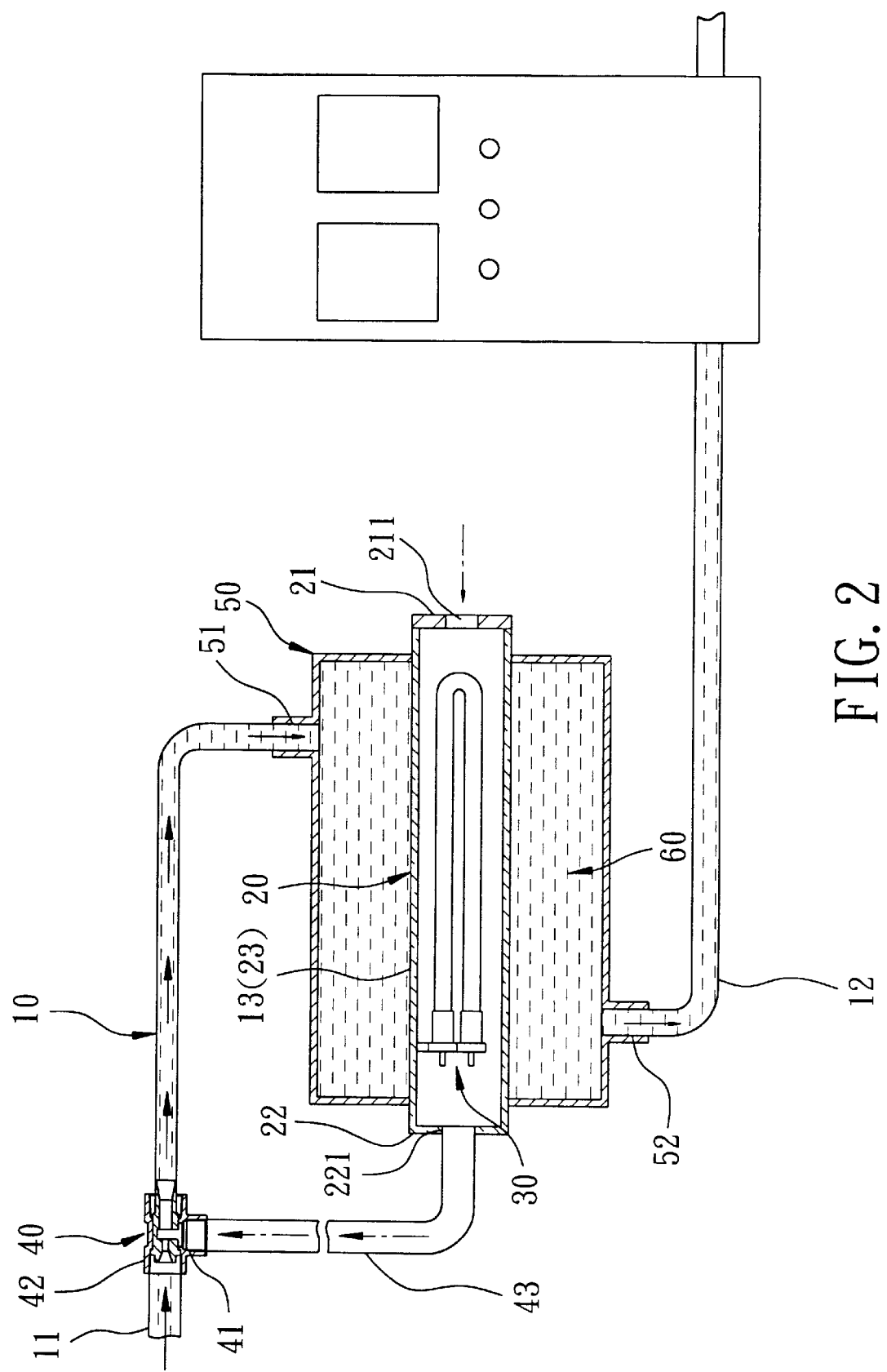
FIG. 2 is a schematic view of a first preferred embodiment of an apparatus for supplying deozonized ozone sterilized water according to this invention.

Referring to FIG. 2, the first preferred embodiment of the apparatus for supplying deozonized ozone sterilized water according to the present invention is shown to comprise a water supplying conduit 10 adapted for water stream flow. The water supplying conduit 10 includes a water feeding inlet 11 which is adapted to be in fluid communication with a water source (not shown), an outlet 12 which is disposed downstream of the water feeding inlet 11 for delivering the deozonized ozone sterilized water, and an intermediate treatment section 13 which is disposed upstream of the outlet 12 and downstream of the water feeding inlet 11 and which is made from an ultraviolet radiation permeable material, such as quartz glass.

An ozone-containing gas generating member 20 is in a tubular form, such as a quartz glass tube, and includes two end walls 21,22 which are disposed opposite to each other and which are provided respectively with an open feeding end 211 for entry of air and an open gas removing end 221. An intermediate surrounding wall 23 is interposed between the end walls 21,22 to serve as an ozone-containing gas generating section. In this embodiment, the intermediate treatment section 13 and the intermediate surrounding wall 23 are juxtaposed to and are integrally formed with each other.

An ultraviolet lamp 30 is received in the intermediate surrounding wall 23 so as to irradiate the air flowing through the intermediate surrounding wall 23 to produce an ozone-containing gas. In addition, the ultraviolet lamp 30 can radiate ultraviolet light through the intermediate surrounding wall 23.

A cooling system includes an outer housing 50 which confines an accommodation chamber 60. The accommodation chamber 60 has an entry port 51 which is communicated with the water supply conduit 10 downstream of the water feeding inlet 11, and an outgoing port 52 which is disposed upstream of the outlet 12 so as to admit the water stream. In addition, the accommodation chamber 60 encloses the intermediate treatment section 13 and the intermediate surrounding wall 23 so as to cool the same using the water stream when the air flowing in the intermediate surrounding wall 23 is irradiated by the ultraviolet lamp 30.

A gas introducing valve 40 includes a proximate end 42 which is disposed to be in fluid communication with the water supplying conduit 10 at a position that is downstream of the water feeding inlet 11 and upstream of the entry port 51 of the outer housing 50, and a distal end 41 which is disposed to be in fluid communication with the gas removing end 221 via a tube 43 so as to entrain the ozone-containing gas in the water stream in the water supplying conduit 10.

As illustrated, air passes through the ozone-containing gas generating member 20 to produce ozone-containing gas which is entrained in the water stream in the water supplying conduit 10 so as to sterilize the water. Then, the ozone-sterilized water flows into the accommodation chamber 60 to cool the ozone-containing gas generating member 20 so as to prevent ozone generated therein from breaking down and dissolving. At the same time, the ultraviolet lamp 30 can irradiate to break down the ozone entrained in the water stream, thereby delivering deozonized ozone sterilized water out of the outlet 12 via the outgoing port 52. As such, by means of the cooling system, the concentration of ozone in the ozone-containing gas in the water stream is high enough to effectively kill microorganisms in the water. Meanwhile, the ozone entrained in the water can be broken down by the radiation of the ultraviolet lamp 30 without the need for subsequent settling process.

Figure 3:
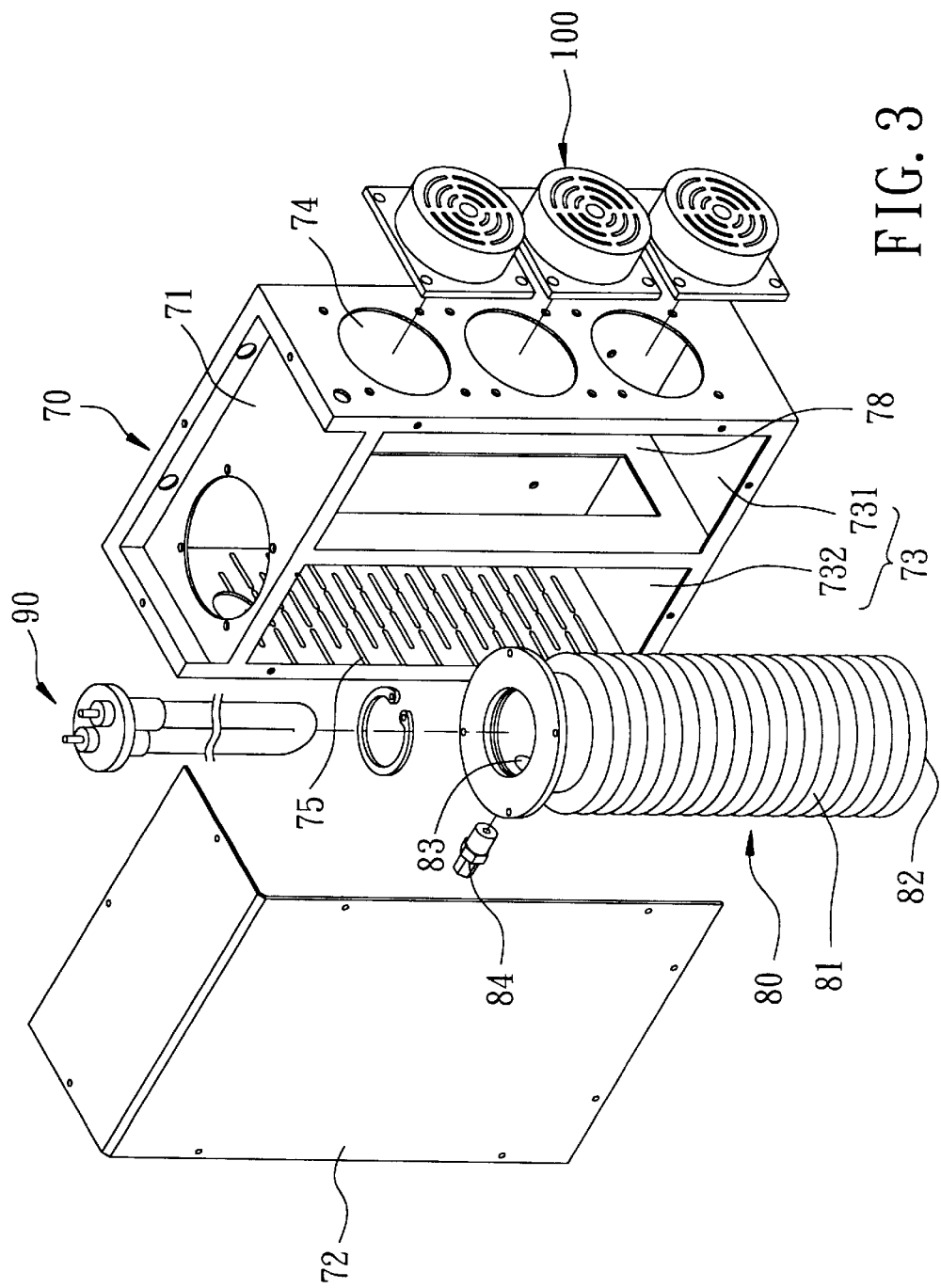
FIG. 3 is an exploded perspective view of a second preferred embodiment of an apparatus for supplying deozonized ozone sterilized water according to this invention, where a water supplying conduit thereof is omitted for the sake of clarity.
Figure 4:
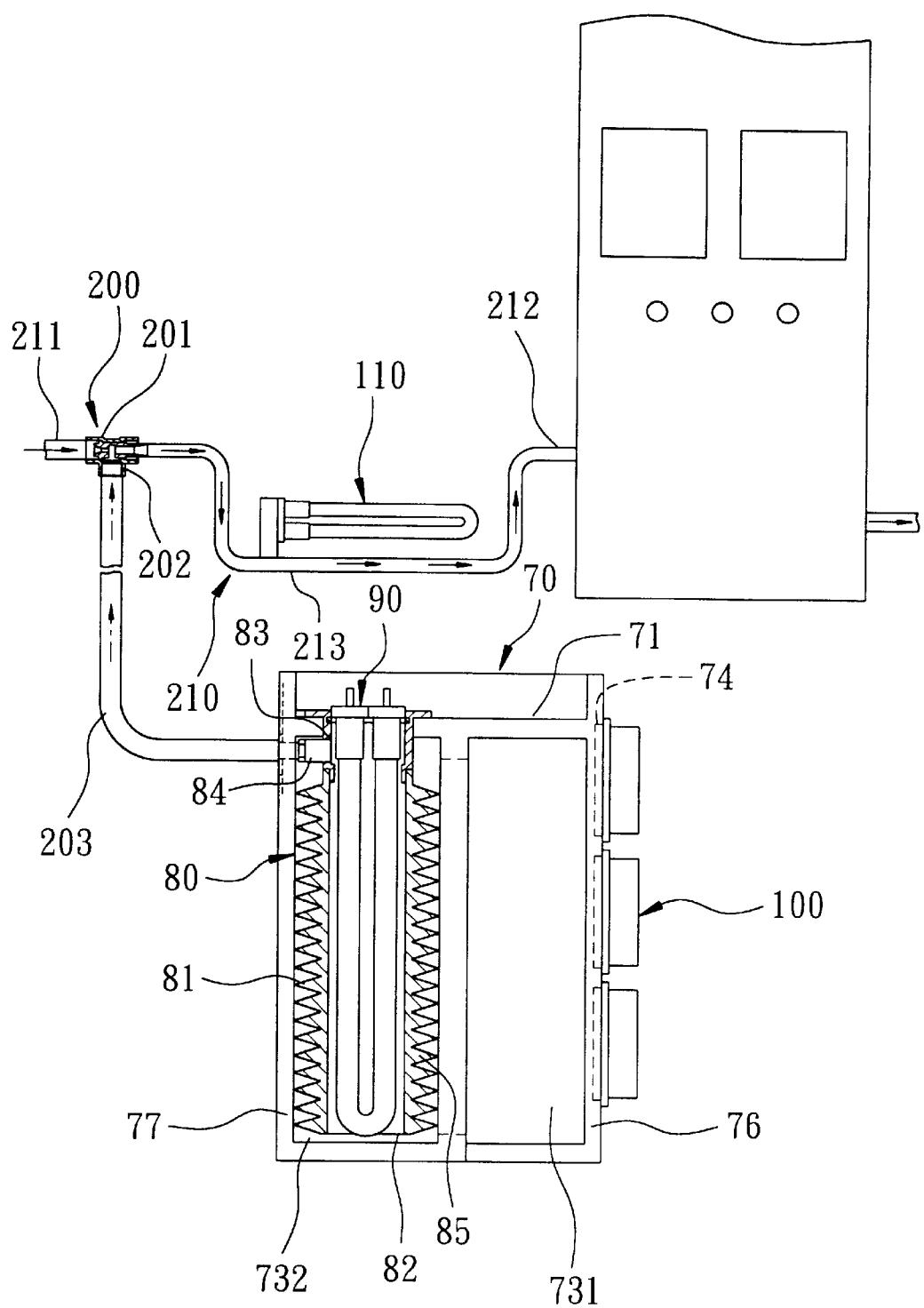
FIG. 4 is a schematic view of the second preferred embodiment.

Referring to FIGS. 3 and 4, the second preferred embodiment of the apparatus for supplying deozonized ozone sterilized water according to this invention is shown to comprise a water supplying conduit 210 which includes a water feeding inlet 211, an outlet 212, and an intermediate treatment section 213 made from an ultraviolet radiation permeable material, and which is adapted for water stream flow.

An outer housing 70 includes a frame 71 with right and left side walls 76,77 which are spaced apart from each other in a transverse direction and which are formed with a plurality of ventilating holes 74 and a plurality of heat exhaust holes 75, and an L-shaped cover 72 disposed to cover the frame 71 so as to confine an accommodation space 73. A partition wall 78 is disposed to divide the accommodation space 73 into two chambers 731,732.

An ozone-containing gas generating member 80 is in a tube form, and is received in the chamber 732. The ozone-containing gas generating member 80 includes two end portions which are disposed opposite to each other in an upright direction transverse to the transverse direction and which are provided respectively with an open feeding end 82 and an open gas removing end 83, and an intermediate surrounding wall 85 which is interposed between and which cooperates with the end portions to confine a receiving space for receiving a first ultraviolet lamp 90 therein.

A cooling system includes a motor-driven impeller member 100 with a plurality of impellers which are secured in the ventilating holes 74 so as to introduce air into the accommodation space 73 and the receiving space in the intermediate surrounding wall 85 via the feeding end 82 to produce ozone-containing gas. A plurality of heat dissipating fins 81 are disposed on the intermediate surrounding wall 85. As such, the impeller member 100 can blow ventilating air in the transverse direction to remove heat generated in the receiving space of the intermediate surrounding wall 85 out of the outer housing 70 via the fins 81 and the exhaust holes 75.

A gas introducing valve 200 includes a proximate end 201 which is disposed to be in fluid communication with the water supplying conduit 210 and downstream of the water feeding inlet 211, and a distal end 202 which is disposed to be in fluid communication with the gas removing end 83 via a tube 203 and a gas nozzle 84 so as to entrain the ozone-containing gas in the water stream.

A second ultraviolet lamp 110 is disposed adjacent to the intermediate treatment section 213 to irradiate the latter to break down the ozone entrained in the water stream flowing therethrough, thereby delivering deozonized ozone sterilized water out of the outlet 212.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. An apparatus for supplying deozonized ozone sterilized water, comprising:

a water supplying conduit adapted for water stream flow, said conduit including a water feeding inlet which is adapted to be in fluid communication with a water source, an outlet for delivering the deozonized ozone sterilized water and disposed downstream of said water feeding inlet, and an intermediate treatment section which is disposed upstream of said outlet and downstream of said water feeding inlet, and which has at least a first transmissible portion that is made from an ultraviolet radiation permeable material;

an ozone-containing gas generating member including a feeding end for entry of oxygen-containing gas, a gas removing end disposed downstream of said feeding end, and an ozone-containing gas generating section disposed upstream of said gas removing end and downstream of said feeding end;

a first ultraviolet lamp unit disposed to irradiate the oxygen-containing gas flowing through said ozone-containing gas generating section to produce an ozone-containing gas;

a cooling system disposed to cool said ozone-containing gas generating section when the oxygen-containing gas flowing therein is irradiated by said first ultraviolet lamp unit;

a gas introducing valve including a proximate end disposed to be in fluid communication with said water supplying conduit at a position which is downstream of said water feeding inlet and upstream of said intermediate treatment section, and a distal end disposed to be in fluid communication with said gas removing end so as to entrain the ozone-containing gas in the water stream; and a second ultraviolet lamp unit disposed adjacent to said first transmissible portion of said intermediate treatment section to irradiate said intermediate treatment section to break down the ozone entrained in the water stream flowing therethrough, thereby delivering the deozonized ozone sterilized water out of said outlet.

2. The apparatus as claimed in claim 1, wherein said first and second ultraviolet lamp units are integrally formed as an ultraviolet lamp which is received in said ozone-containing gas generating section, said ozone-containing gas generating member being in a tubular form, and including two end walls opposite to each other and provided respectively with said feeding end and said gas removing end, and an intermediate surrounding wall interposed between said end walls to serve as said ozone-containing gas generating section, said intermediate surrounding wall having a second transmissible portion which is made from an ultraviolet radiation permeable material so as to permit said ultraviolet lamp to radiate ultraviolet light through said intermediate surrounding wall.

3. The apparatus as claimed in claim 2, wherein said cooling system includes an outer housing confining an accommodation chamber which has an entry port and an outgoing port respectively disposed downstream of said proximate end of said gas introducing valve and upstream of said outlet so as to admit the water stream, and which encloses both said intermediate treatment section and said intermediate surrounding wall, such that said second transmissible portion and said first transmissible portion are juxtaposed to and are integrally formed with each other.

4. The apparatus as claimed in claim 1, wherein said first and second ultraviolet lamp units are first and second ultraviolet lamps respectively, said ozone-containing gas generating member being in a tube form and including two end portions which are disposed opposite to each other in an upright direction and which are provided respectively with said feeding end and said gas removing end, and an intermediate surrounding wall which is interposed between and which cooperates with said end portions to confine a receiving space for receiving said first ultraviolet lamp therein and which serves as said ozone-containing gas generating section.

5. The apparatus as claimed in claim 4, wherein said cooling system includes a plurality of heat dissipating fins disposed on said intermediate surrounding wall, and a motor-driven impeller member disposed to introduce air into said receiving space via said feeding end and to dissipate heat generated in said receiving space of said intermediate surrounding wall.

6. The apparatus as claimed in claim 5, further comprising an outer housing including left and right side walls which are spaced apart from each other in a transverse direction transverse to the upright direction, said impeller member being mounted and supported on said right side wall, said ozone-containing gas generating member being mounted between said impeller member and said left side wall, said cooling system further including a plurality of heat exhaust holes formed in said left side wall such that said impeller member blows ventilating air in the transverse direction to remove heat in said outer housing via said exhaust holes.

* * * * *